United States Patent [19]
Ishinabe et al.

[11] Patent Number: 5,457,692
[45] Date of Patent: Oct. 10, 1995

[54] CALLING METHOD FOR COMMUNICATION TERMINAL DEVICE

[75] Inventors: Iwao Ishinabe, Yokohama; Nobuyuki Matsuyama, Fujisawa, both of Japan

[73] Assignee: Hitachi, Ltd., Tokyo, Japan

[21] Appl. No.: 26,759

[22] Filed: Mar. 5, 1993

[30] Foreign Application Priority Data

May 19, 1992 [JP] Japan ................... 4-126447

[51] Int. Cl.⁶ ..................................... H04J 3/12
[52] U.S. Cl. ........................ 370/110.1; 379/359
[58] Field of Search .................. 370/110.1, 62, 370/95.1, 58.1, 58.2, 58.3; 379/156–158, 201, 204–206, 171–173, 352, 355, 356, 387, 389, 359

[56] References Cited

U.S. PATENT DOCUMENTS

| | | | |
|---|---|---|---|
| 4,521,648 | 6/1985 | Hegi | 379/359 |
| 4,930,155 | 5/1990 | Kurokawa | 379/355 |
| 4,932,046 | 6/1990 | Katz et al. | 379/352 |
| 5,119,413 | 6/1992 | Okumura et al. | 379/156 |
| 5,124,985 | 6/1992 | Hoshikawa | 370/95.3 |
| 5,187,740 | 2/1993 | Swaim et al. | 379/355 |

Primary Examiner—Douglas W. Olms
Assistant Examiner—Chau T. Nguyen
Attorney, Agent, or Firm—Antonelli, Terry, Stout & Kraus

[57] ABSTRACT

Method and device can be provided which can establish two or more communication channels for a called terminal having different called addresses for different channels by a single calling address. When keys are input in the order of "0014723244*3245#" for example, from a key input section, a key input control section transfers the key input contents before "*" to a communication control section as dial information and starts a send operation with the dial information "0014723244" as a called party address. Subsequently, the key input control section replaces the lower order digits of the key input contents before * by the contents between "*" and "#". It transfers the key input contents after replacement to the communication control section as dial information and starts the send operation with the dial information "0014723245" as the called party address.

16 Claims, 4 Drawing Sheets

CALLING METHOD FOR COMMUNICATION TERMINAL DEVICE

CROSS REFERENCE TO RELATED APPLICATION

This application relates to U.S. patent application Ser. NO. 07/838,348 filed on Feb. 20, 1992, and assigned to the present assignee now U.S. Pat. No. 5,396,269. The content of that application is incorporated herein by reference.

BACKGROUND OF THE INVENTION

This invention relates to a communication terminal device for connecting plural channels with a communication network through settable user-network interfaces.

The prior art will be explained assuming that the communication network is an ISDN (integrated services digital network). The INS (information network system) which is ISDN provided by NTT Co. Ltd in accordance with the CCITT recommendation I-series has two user-network interfaces, i.e., a basic rate user-network interface (BRI) and a primary rate user-network interface (PRI). Using the same called party number, two user information transfer channels (B channels) can be set on BRI and 23 B channels can also be set on PRI. An address can be set for each user-network interface. A subaddress can be set on each communication terminal connected with the user-network interface.

In such a communication network, where a called terminal (called communication terminal device) and a calling terminal (calling communication terminal device) are connected using two B channels simultaneously, the called terminal will have the two B channels allotted with the same address. Thus, the calling terminal repeatedly calls one called address and called subaddress input by a user into the network for the two B channels so that the two B channels can be established between the calling terminal and the called terminal. In this way, in the same series of calling procedures as where a user intends to connect one channel, it is possible to direct the communication terminal to connect plural communication channels.

However, there are cases where an address is allotted not for each user-network interface, but each B channel included in each user-network interface. In this case, different addresses are allotted for different B channels. Further, in some countries, the user-network interface including only one B channel is provided. In this case, in order to assure plural B channels, plural user-network interfaces are necessary. In both cases, one communication terminal has plural B channels allotted with different addresses. Thus, it is necessary to give plural channels plural addresses so that the above cases are not dealt with by the repeated calling processing by the calling terminal. It was therefore necessary to repeat the calling procedure for one called party address and subaddress for connection of one channel by the number of times corresponding to the number of channels.

SUMMARY OF THE INVENTION

An object of the present invention is to provide a communication terminal device which permits a user to direct plural communication channels to be connected in the same calling procedure series as in connecting one communication channel even where different addresses should be allotted to plural channels at a called terminal.

In order to attain the above object, in accordance with the present invention, there is provided a calling processing method in which a calling terminal connected with a communication terminal, incorporating plural channels and having a function for making communication simultaneously using plural channels successively receives plural called party numbers, separates the numbers into individual called party numbers, successively, allots the separated called party numbers to plural channels, respectively, and successively requests the communication network to connect the called party number allotted to the channel at issue of the plural channels with a called terminal or distant terminal whereby plural communication channels can be established between the calling terminal and the called terminal. Thus, in accordance with the present invention, where addresses are allotted to plural channels at the called terminal, a single calling operation permits plural communication channels to be established.

DESCRIPTION OF THE PREFERRED EMBODIMENTS

The communication terminal device according to the present invention will be explained in connection with its embodiments.

Figure 1:
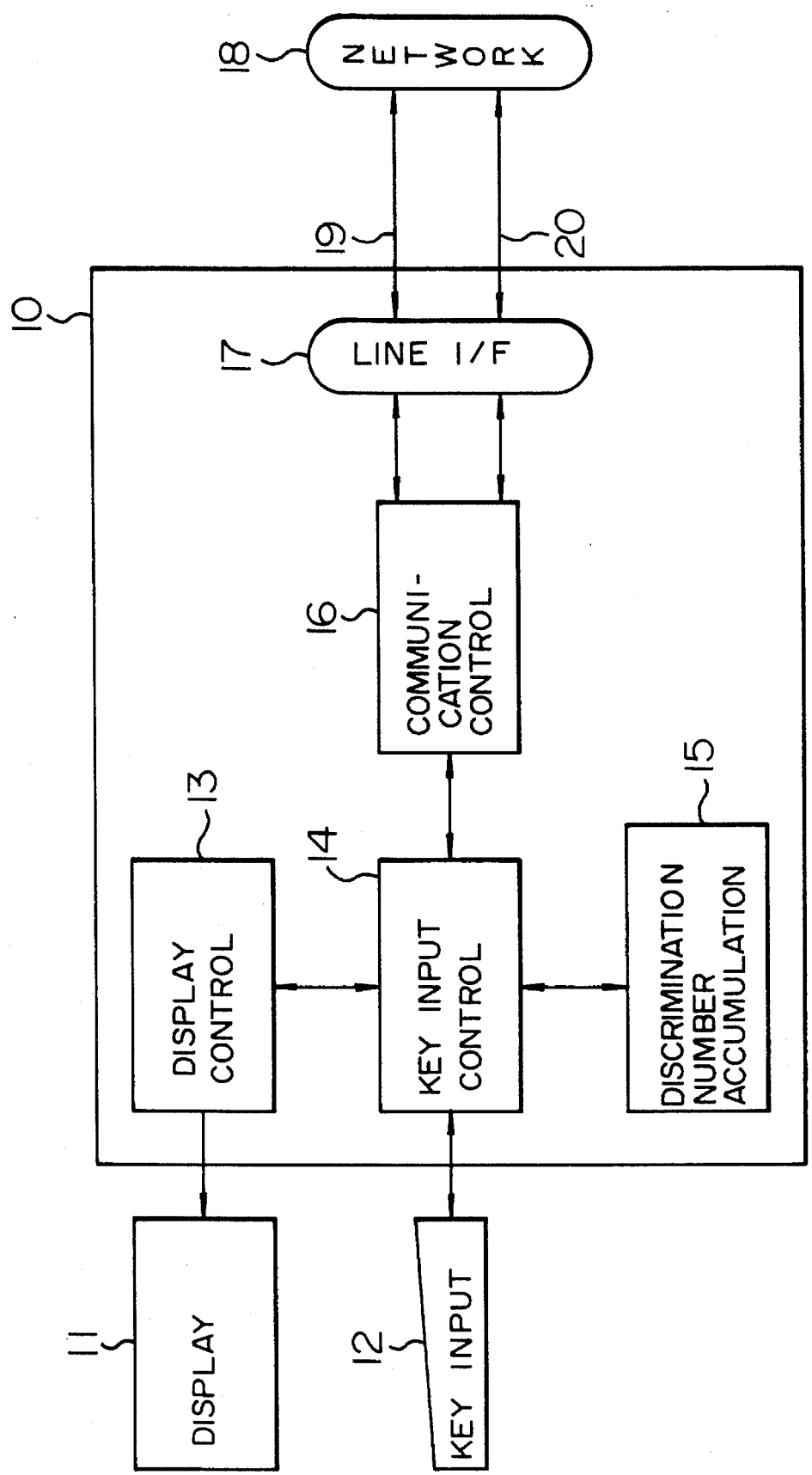
FIG. 1 is a block diagram of the arrangement of the communication terminal device according to one embodiment of the present invention.

FIG. 1 shows an arrangement of the communication terminal device according to one embodiment of the present invention. In FIG. 1, reference numeral 11 denotes a display; 12 a key input section; 13 a display control section; 14 a key input control section; 15 a discrimination number accumulation section; 16 a communication control section; 17 a line interface (I/F); 18 a digital communication network; 19 denotes a first channel (channel 1); and 20 a second channel (channel 2). It is assumed that the communication terminal device according to this embodiment can use two channels simultaneously. It should be noted that the channels 19 and 20 correspond to one channel for transferring user information.

Figure 2:
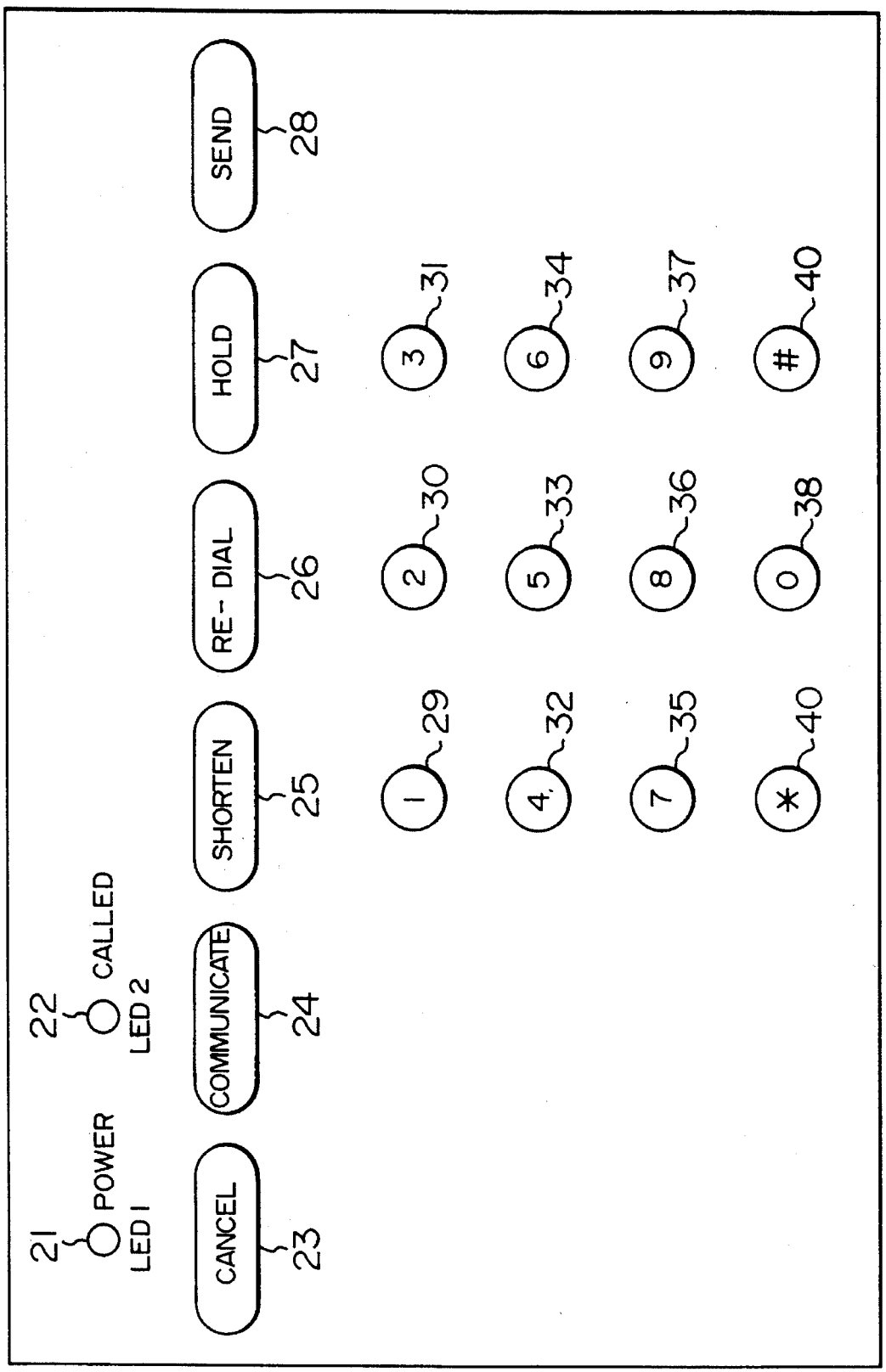
FIG. 2 is a view for explaining the key construction at a key input port in the communication terminal device according to one embodiment of the present invention.

FIG. 2 shows the key arrangement on the key input section 12. In FIG. 2, reference numeral 21 denotes a power display LED; 22 an incoming display LED; 23 an input canceling key for canceling the last input key; 24 a communication key used for start/end of communication; 25 a shortening key for calling a registered partner's dial using a shortened number; 26 a re-dialing key for re-dialing the most recently dialed partner; 27 a holding key for interrupting communication; 28 a send key for starting a send operation for the digital communication network using the dial number whose input has been completed; 29 to 38 dial keys for 1 to 9 and 0, correspondingly; 39 a * key for making a pause between the inputs of the dial number of the first line and that of the second line in the communication terminal device according to this embodiment as described later; and 40 a # key used for the same function as the send key in this communication terminal device.

An explanation will be given of the operation of each section in calling processing.

The key input information input from the key input section 12 is input to the key input control section 14. The key input control section 14 decides the contents of the key input to control each section in accordance with the combination of input keys. The key input control section 14 accumulates the contents of the key inputs in the discrimination number accumulation section 15 and also transfers them to the display control section 13 so as to be displayed on the display section 11. Further, the contents of the key inputs are transferred to the communication control section 16 as dialing information to direct that the send operation should be started.

When the communication control section 16 is directed to start the send operation by the dial information received from the key input control section 14, it makes a send request for the digital communication network 18 through the line interface (I/F) 17. Further, when the communication control section 16 receives from the digital communication network 18 a response message that a connection has been made with a partner's communication terminal, it connects the connected channel with the transfer channel in the communication control section to make communication.

When using two channels simultaneously, the communication terminal device makes communication with a called terminal incorporating two channels allotted with different addresses, a user inputs two addresses and subaddresses allotted for the called terminal successively using the dial keys (pauses are made between these addresses using the "*" key 49 and the send operation is directed through the "send" key 28 or "#" key 40).

An explanation will be given of the case where the called terminal has no subaddresses and calling is made for two called addresses of "0014723244" and "0014723245". A user successively inputs the first address, a pause and the second address to direct the send operation. Namely, "0014723244*0014723245#" is input ("send" may be used instead of "#"). Further, where high order digits in both addresses are the same and only the lower order digits are different, input of the part in the second address coincident with the corresponding part in the first address can be omitted. Namely, "0014723244*3245#" may be input ("send" may be used instead of "#").

Figure 3:
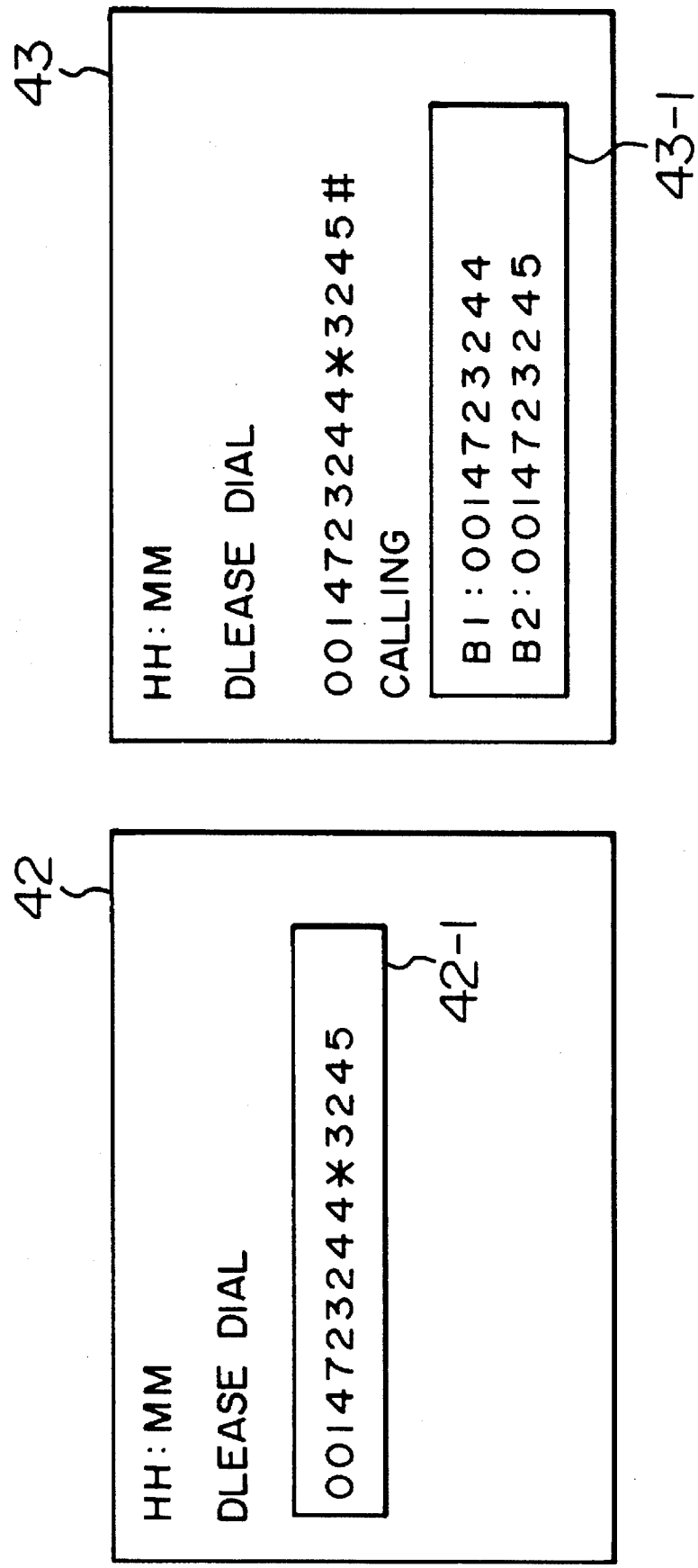
FIG. 3 is a view for explaining the display image displayed when the communication terminal device according to the present invention performs calling processing.

FIG. 3 shows an input promotion/input response display image 42 and a send starting display image 43 which are displayed on the display 11.

The image 42 displays the state of the dial input 42-1 up until "0014723244*3245", and the image 43 displays the state immediately after the "#" key has been pressed on the image 42. The image 43 includes both the display of "calling" and the display 43-1 of two different dial numbers which are being subjected to the connection processing.

Figure 4:
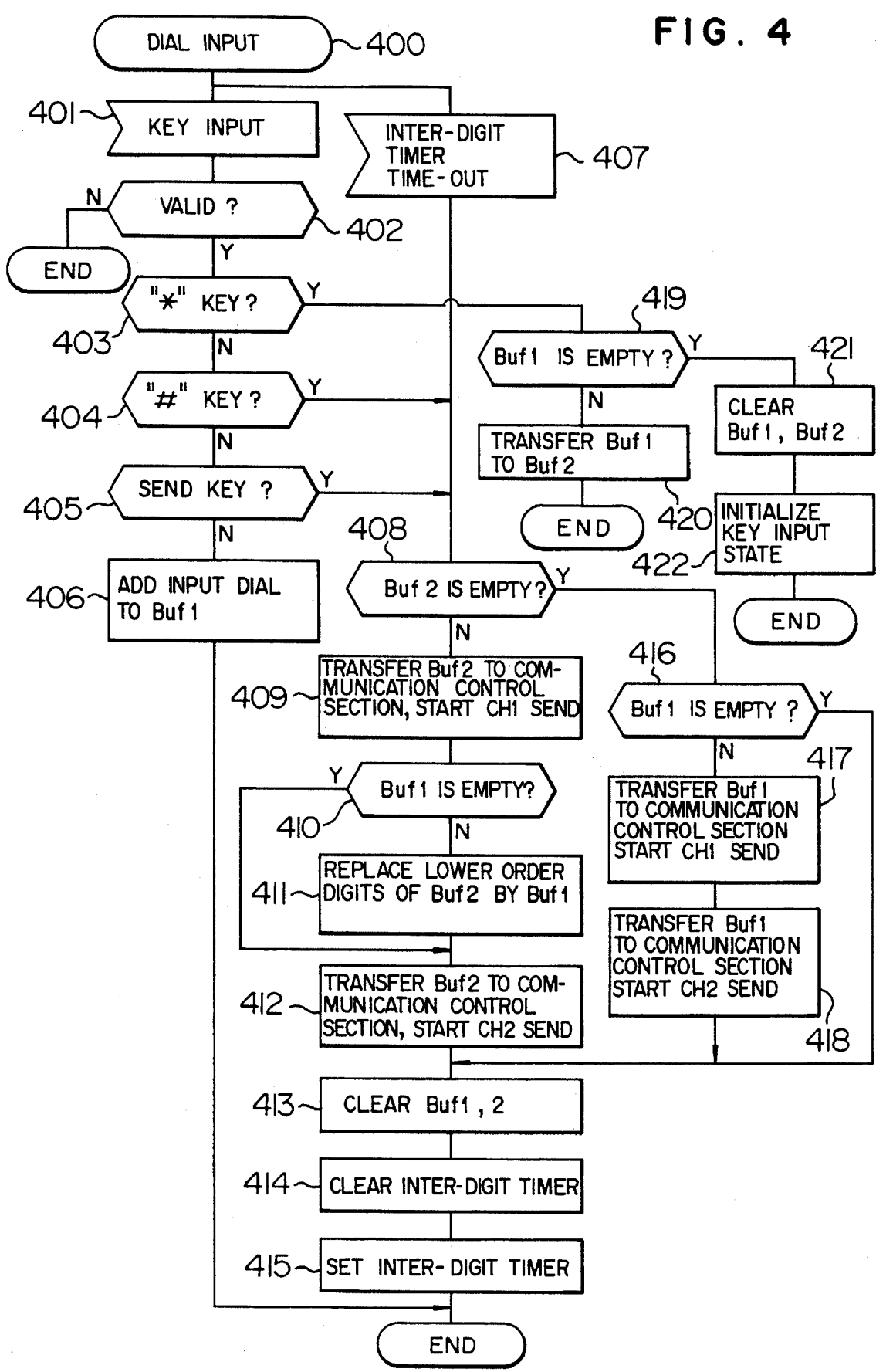
FIG. 4 is a flowchart showing the procedure of calling control processing by the communication terminal device according to one embodiment of the present invention.

Such calling processing using two channels simultaneously is controlled by the key input control section 14. FIG. 4 shows the procedure of the calling control processing by the key input control section 14.

In FIG. 4, reference numeral 401 denotes an key input event. The subsequent processing is started whenever the key input on the key input section 12 is transferred to the key input control section 14. Reference numeral 407 denotes an inter-digit timer time-out event. The subsequent processing is started when there is no key input exceeding the inter-digit time-out time after the last key input. Symbols Buf 1 and Buf 2 denote buffers for accumulating key inputs provided in the discrimination number accumulation section 15. The number of the buffers is equal to the predetermined number of channels used in the communication terminal.

Reference numeral 402 denotes key input valid/invalid decision processing; 403 * key decision processing; 404 # key input decision processing; 405 send key decision processing; 406 dial accumulation processing; 408 empty decision processing in Buf 2; 409 channel 1 send starting processing by the dial number (address) in Buf 2; 410 empty decision processing in Buf 1; 411 processing of replacing the lower order digits of the content of Buf 2 by the entire content of Buf 1 in the second address compound processing; 412 channel 2 send starting processing by the dial number (address) of Buf 2; 413 Buf clear processing; 414 inter-digit timer clear processing; 415 inter-digit timer setting processing; 416 empty decision processing in Buf 2; 417 channel 1 send starting processing by the dial number of Buf 1; 418 channel 2 send starting processing by the dial number of Buf 1; 419 empty decision processing in Buf 1; 420 transfer processing by Buf 1; 421 buffer clear processing; and 422 initializing processing of key input.

An explanation will be given of the procedure of calling control processing of the key input control section 14 as shown in FIG. 4 as to where key inputs have been made in the order of "0014723244*3245#".

First, when the key inputs are made in the order of "0014723244", the key input control section 14 stores the content of each key input in Buf 1 (406). When the "*" key is input, in the * key decision processing 403, it is discriminated, and the contents of Buf 1 are transferred to Buf 2 (420). When the key inputs are made in the order of "3245", each input is stored in Buf 1 (406). Finally, when the "#" key is input, in the # key decision processing 404, it is discriminated, and the contents of Buf 2 are transferred to the communication control section 16 as dial information to start the send operation with a called address being this dial information (409). The contents of Buf 2 are replaced in its lower order digits by those of Buf 1 (411). The contents of Buf 2 after having been replaced are transferred to the communication control section 16 as dial information to start the send operation with a called address being this dial information (409). When the second address is input with no omission, in the processing of 411, the contents of Buf 2 are replaced by those of Buf 1, and in the same manner as described above, the send operation for the two channels will be started.

Where the same address is allotted to two channels at the called communication terminal, a user inputs the single address and # or the "send", e.g., "0014723244#". In this case, after the # key input is discriminated in the # key decision processing 404, it is discriminated that the contents of Buf 2 are empty (408). The contents of Buf 1 are transferred to the communication control section 16 as dial information and the processing of starting the send operation with a called address of the dial information is repeated (417, 418).

As described above, by using the * key as a pausing key, in both cases where in order to establish two channels, the same dial number is used and two different dial numbers are used, a user can direct connection of two channels in similar calling operation procedure.

Where different subaddresses are allotted to different channels at the called terminal device, a key for discriminating the called address and the called subaddress may be provided. This key can be input to discriminate the called address and the called subaddress, and the processing 411 for replacement can be performed for both the called address and called subaddress. Further, as described above, two addresses and subaddresses input with a pause located between them by the * key 40 and allotted to the called terminal may be registered in the communication terminal device. In this case, the shortening key 25 may be pressed down to perform the calling for these addresses. This processing can be executed in such a manner that the key input control section 14 accesses the registration contents to perform each processing in FIG. 4. Additionally, the functions of the * key and # key may be substituted for each other.

Although in the embodiment described above, communication was made between communication terminals using two channels simultaneously, this invention may also be also applied to the case where the communication is made using three or more channels simultaneously. In this case, the communication terminal device is provided with buffers for accumulating called party numbers, the number of which is that of channels to be used simultaneously. For example, where n channels are to be used simultaneously, n buffers are provided. The calling terminal receives a series of key inputs of "0014723241*3242*3243* . . . *324n#". The key input series before the first "*" key input is stored in the first buffer, and subsequently the key input series to the "*" or "#" are stored in the second to n-th buffers, respectively. When "#" is input, the key input series stored in the first buffer is allotted to the first channel as the first address to be called, and subsequently, the first called party number with its lower order digits replaced by the key input series stored in the k-th ($2 \leq k \leq n$) is allotted to the k-th channel as the k-th address to be called.

The following alternative way of making communication simultaneously using three or more channels can be proposed.

Where n channels are to be simultaneously used, n channel designation keys for designating different channels are provided. Specifically, where plural called party addresses are to be designated, at the end of each called address, a channel designation key for designating the channel for calling using the pertinent called address is added to be successively input. Starting with the initial key input series, the communication terminal device allots the key input series before the first initial key, as the first called address, to the channel designated by the first channel designation key and calls the allotted address. Subsequently, the communication terminal device allots the key input series between the k($1 \leq k \leq n$)-th and the (k+1)-th channel designation keys, as the (k+1)-th address, to the channel designated by the (k+1)-th channel designation key and calls the allotted address.

Where the k-th and (k+1)-th channel designation keys are successively input, the k-th called address is also allotted to the channel designated by the (k+1)-th channel designation key as the (k+1)-th called address to be called.

In accordance with the present invention, a communication terminal device can be provided which permits a user to direct plural communication channels to be connected in the same series of calling procedure as in connecting one communication channel even where different addresses should be allotted to plural channels at a called terminal.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. A communication terminal device, comprising:

a line interface I/F, connected with a communication network, for accommodating L channels, L being an integer equal to or greater than 2;

key input means provided with a plurality of keys for inputting a plurality of called party numbers;

communication control means, connected to said line I/F, for controlling communication connection between the communication terminal device and a called communication terminal device through said communication network; and key input control means for extracting a called party number from a key input series including the plurality of called party numbers input from said key input means, and providing the extracted called party number to said communication control means to connect said L channels with said called communication terminal device, wherein said key input means includes a pausing key for inputting a pause between individual ones of the plurality of called party numbers, and when n ($L > n \geq 1$) inputs of said pausing key are included in the key input series input from said key input means, said key input control means directs said communication control means to connect a first channel of said L channels with the called communication terminal using the key input series input as a first called party number before a first input of said pausing key, directs said communication control means to connect subsequent channels of said L channels with the called communication terminal using subsequent key input series input between inputs of said pausing key, and directs said communication control means to connect the (n+1)-th channel of said L channels with the called communication terminal using the key input series input after an n-th input of said pausing key as a (n+1)-th called party number.

2. A communication terminal device according to claim 1, wherein when no input of said pausing key is included in the key input series, said key input control means directs said communication control means to connect the first through m-th ($L \geq m \geq 2$) channels of said L channels with the called communication terminal using the key input series as a called party number.

3. A communication terminal device according to claim 2, wherein said pausing key is a key labelled "*" or "#".

4. A communication terminal device according to claim 2, wherein said line I/F is an interface dedicated to an integrated services digital network ISDN, and each of the called party numbers input from said input control means and separated by said pausing key represents either of a called party address and the called party address and a corresponding called party subaddress.

5. A communication terminal device according to claim 1, wherein said pausing key is a key labelled "*" or "#".

6. A communication terminal device according to claim 1, wherein said line I/F is an interface dedicated to an integrated services digital network ISDN, and each of the called party numbers input from said input control means and separated by said pausing key represents either of a called party address and the called party address and a corresponding called party subaddress.

7. A communication terminal device, comprising:

a line interface I/F, connected with a communication network, for accommodating L channels, L being an integer equal to or greater than 2;

key input means provided with a plurality of keys for inputting a plurality of called party numbers;

communication control means, connected to said line I/F, for controlling communication connection between the communication terminal device and a called communication terminal device through said communication network; and key input control means for extracting a called party number from a key input series including the plurality of called party numbers input from said key input means, and providing the extracted called party number to said communication control means to connect said L channels with said called communication terminal device, wherein said key input means includes a pausing key for inputting a pause between individuals ones of the plurality of called party numbers, and when n (L>n≧1) inputs of said pausing key are included in the key input series input from said key input means, said key input control means directs said communication control means to connect a first channel of said L channels with the called communication terminals using the key input series input as a first called party number before a first input of said pausing key, directs said communication control means to connect subsequent channels of said L channels with the called communication terminal using said first called party number with its lower order digits replaced by a key input series input between a k-th (1≦k<n) and a (k+1)-th input of said pausing key as a (k+1)-th called party number, and directs said communication control means to connect a (n+1)-th channel of said L channels with the called communication terminal using said first called party number with its lower order digits replaced by the key input series input after an n-th input of said pausing key as a (n+1)-th called party number.

8. A communication terminal device according to claim 7, wherein when no input of said pausing key is included in the key input series, said key input control means directs said communication control means to connect the first to through m-th (L≧m≧2) channel of said L channels with the called communication terminal using the key input series as a called party number.

9. A communication terminal device according to claim 8, wherein said pausing key is a key labelled "*" or "#".

10. A communication terminal device according to claim 8, wherein said line I/F is an interface dedicated to an integrated services digital network ISDN, and each of the called party numbers input from said input control means and separated by said pausing key represents either of a called party address and the called party address and a corresponding called party subaddress.

11. A communication terminal device according to claim 7, wherein said pausing key is a key labelled "*" or "#".

12. A communication terminal device according to claim 7, wherein said line I/F is an interface dedicated to an integrated services digital network ISDN, and each of the called party numbers input from said input control means and separated by said pausing key represents either of a called party address and the called party address and a corresponding called party subaddress.

13. A communication terminal device, comprising:

a line interface I/F, connected with a communication network, for accommodating L channels, L being an integer equal to or greater than 2;

key input means provided with a plurality of keys for inputting a plurality of called party numbers;

communication control means, connected to said line I/F, controlling communication connection between the communication terminal device and a called communication terminal device through said communication network; and key input control means for extracting a called party number for a key input series including the plurality of called party numbers input from said key input means, and providing the extracted called party number to said communication control means to connect said L channels with said called communication terminal device, wherein said key input means includes L channel designation keys for designating individual channels of said L channels, and when j (L≧j≧2) inputs of said channel designation keys are included in a key input series input from the said key input means, said key input control means directs said communication control means to connect a channel designated by a first input of said channel designation keys with a called communication terminal using the key input series input before the first input of said channels designation keys is input as a first called party number, and directs said communication control means to connect the channel designated by the input of the h-th channel designation key with the called communication terminal device using the key input series between the h-th (1≦h≦j) and (h+1)-th inputs of the channel designation keys as a (h+1)-th called party number, when there is such a key input series and using the h-th called party number as the (h+1)-th called party number when there is no key input series between the h-th (1≦h<j) and (h+1)-th channel inputs of the channel designation keys.

14. A communication terminal device according to claim 13, wherein said line I/F is an interface dedicated to an integrated services digital network ISDN, and each of the called party numbers input from said input control means and separated by said pausing key represents either of a called party address and the called party address and a corresponding called party subaddress.

15. An integrated services digital network terminal device, comprising:

key input means connected with an ISDN through a basic rate user interface BRI including two B channels, and provided with a plurality of keys for inputting either of called party addresses and called party addresses and corresponding called party subaddresses;

communication control means for controlling connection of the two B channels with a called communication terminal device;

key input control means for directing said communication control means to connect each of said B channels with said called communication terminal device at either of the called party addresses and the called party addresses and the corresponding called party subaddresses which is a key input series input from said key input means; and means for making communication with the called terminal device simultaneously using the two B channels connected thereto, wherein said key input means includes a pausing key for inputting a pause between the called party numbers, and further wherein when any input of said pausing key is included in the key input series input from the said key input means, said key input control means directs said communication control means to connect the first B channel with the called communication terminal at either of a first called party address and a first called party address and a corresponding first called party subaddress which is the key input series input before said pausing key is input, and directs said communication control means to connect the second B channel with the called communication terminal at either of a second called party address and a second called party address and a corresponding second called party subaddress which is either of the first called party address and the first called party address and corresponding first called party subaddress, respectively, modified on the basis of the key input series inputted after said pausing key is input, and wherein even further, when no input of said pausing key is included in the key input series input from said key input means, said key input control means directs said communication control means to connect the first and second B channels with the called communication terminal at either of the called party address and the called party address and corresponding called party subaddress which is the key input series input.

16. A communication terminal device, comprising:

a line interface I/F, connected with a communication network, for accommodating L channels, L being an integer equal to or greater than 2;

key input means provided with a plurality of keys for inputting a plurality of called party numbers;

communication control means, connected to said line I/F, for controlling communication connection between the communication terminal device and a called communication terminal through said communication network; and key input control means for extracting a called party number from a key input series including the plurality of called numbers input from said key input means, and using the extracted called party number, directing said communication control means to connect said channels with said called communication terminal device;

number accumulation section for receiving and accumulating, through said key input control means, the key input series input from said key input means; and display means for displaying the key input series input from said key input means and response of said key input control means, wherein said key input means includes a pausing key for inputting a pause between individual ones of the called party numbers, wherein further, when n (L>n≧1) inputs of said pausing keys are included in the key input series input from said key input means, said key input control means directs said communication control means to connect the first channel of said L channels with the called communication terminal using the key input series input before a first input of said pausing key as a first called party number, directs said communication control means to connect the (k+1)-th channel of said L channels with the called communication terminal using said first called party number with its lower order digits replaced by the key input series input between a k-th (1≦k<n) input and the (k+1)-th input of said pausing key as a (k+1)-th called party number, and directs said communication control means to connect the (n+1)-th channel of said L channels with the called communication terminal using said first called party number with its lower order digits replaced by the key input series input after an n-th input of said pausing key as a (n+1)-th called party number, and wherein even further, when no input of said pausing key is included in the key input series, said key input control means directs said communication control means to connect the first key input series to m-th (L≧m≧2) channel of said L channels with the called communication terminal using the key input series as a called party number.

* * * * *